United States Patent
Cha et al.

(10) Patent No.: US 7,880,764 B2
(45) Date of Patent: Feb. 1, 2011

(54) THREE-DIMENSIONAL IMAGE DISPLAY APPARATUS

(75) Inventors: Kyung-hoon Cha, Yongin-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1478 days.

(21) Appl. No.: 11/273,414

(22) Filed: Nov. 15, 2005

(65) Prior Publication Data

US 2006/0125917 A1   Jun. 15, 2006

Related U.S. Application Data

(60) Provisional application No. 60/634,992, filed on Dec. 13, 2004.

(30) Foreign Application Priority Data

Mar. 7, 2005   (KR) .................. 10-2005-0018745

(51) Int. Cl.
*H04N 13/04* (2006.01)
*G06F 3/041* (2006.01)

(52) U.S. Cl. ........................ 348/51; 345/173

(58) Field of Classification Search ............ 348/51, 348/77, 36, 225.1, 142, 602, 143, 47; 382/107; 715/727, 863, 781; 345/173, 156, 419, 8, 345/157
See application file for complete search history.

(56) References Cited

U.S. PATENT DOCUMENTS 5,913,918 A * 6/1999 Nakano et al. .............. 701/208
2002/0158827 A1* 10/2002 Zimmerman ................. 345/88
2004/0172173 A1* 9/2004 Goto et al. .................... 701/1
2005/0156882 A1* 7/2005 Manchester ................ 345/158

FOREIGN PATENT DOCUMENTS

| CN | 1542495 A | 11/2004 |
|---|---|---|
| JP | 6-318058 A | 11/1994 |
| JP | 8-86977 A | 4/1996 |
| JP | 08-287291 A | 11/1996 |
| JP | 8-339043 A | 12/1996 |
| JP | 10-49290 A | 2/1998 |
| JP | 2000-308092 A | 11/2000 |
| JP | 2003-18501 A | 1/2003 |
| JP | 2003-216300 A | 7/2003 |
| JP | 2004-264587 A | 9/2004 |

* cited by examiner

*Primary Examiner*—Saeid Ebrahimi Dehkordy
(74) *Attorney, Agent, or Firm*—Sughrue Mion, PLLC

(57) ABSTRACT

Provided is a three-dimensional (3D) image display apparatus, which can sense a displacement of a display using a gyroscopic sensor and control a 3D image displayed on the display using the sensed result. The 3D image display apparatus includes a body, a display displaying a 3D image, a gyroscopic sensor mounted on the body and sensing the displacement of the display, and a controller selecting one of at least two-viewpoint three-dimensional image data according to the displacement of the display sensed by the gyroscopic sensor and providing the selected data to the display. Multi-viewpoint three-dimensional image data can be provided according to the displacement of the display relative to a viewer's position.

7 Claims, 8 Drawing Sheets

| RELATED FIGURE | VIEW | 3D IMAGE | RELATED FIGURE | VIEW | 3D IMAGE |
|---|---|---|---|---|---|
| FIG 6 | 1 (RIGHT EYE) |  | FIG 3 | 5 (RIGHT EYE) |  |
| | 2 (LEFT EYE) | | | 6 (LEFT EYE) | |
| | 2 (RIGHT EYE) |  | | 6 (RIGHT EYE) |  |
| | 3 (LEFT EYE) | | | 7 (LEFT EYE) | |
| | 3 (RIGHT EYE) |  | FIG 7 | 7 (RIGHT EYE) |  |
| | 4 (LEFT EYE) | | | 8 (LEFT EYE) | |
| | 4 (RIGHT EYE) |  | | | |
| | 5 (LEFT EYE) | | | | |

# THREE-DIMENSIONAL IMAGE DISPLAY APPARATUS

This application claims the priority of U.S. Patent Application No. 60/634,992, filed on Dec. 13, 2004, in the U.S. Patent and Trademark Office and the priority of Korean Patent Application No. 10-2005-0018745, filed on Mar. 7, 2005, in the Korean Intellectual Property Office, the entire disclosures of which are incorporated herein by reference.

BACKGROUND OF THE INVENTION

1. Field of the Invention

The present invention relates to a three-dimensional (3D) image display apparatus using a gyroscopic sensor, and more particularly, to a 3D image display apparatus, which recognizes a motion change of a display using a gyroscopic sensor and controls a 3D image displayed on the display using the recognition result.

2. Description of the Related Art

In general, a conventional three-dimensional (3D) image display apparatus uses the binocular parallax effect to represent data in two fields, one containing the data to be seen by the left eye and the other containing data to be seen by the right eye. Accordingly, the viewer can see a 3D image produced by the fusion of two slightly different views of a scene on retinas of both eyes.

Such 3D image display apparatus can be widely used for medical applications, games, advertisement, education applications, and military training, where a stereoscopic image is required.

FIG. 1 is a schematic view of a conventional 3D image display apparatus. Referring to FIG. 1, the conventional 3D image display apparatus includes an image screen 1, which provides images L1 through L6 for the left eye and images R1 through R6 for the right eye, and a lenticular screen 3, which is disposed in front of the image screen 1 and adapted to separate the images for a viewer's left and right eye views.

The images for the left eye and the right eye are photographed by two cameras spaced from each other by a distance equal to that between a viewer's left and right eyes, and thus due to the binocular parallax effect, the images respectively seen by the left and right eyes are slightly different from each other. The two images are provided through the image screen 1 and the lenticular screen 3. Each of the images for the left eye and the images for the right eye is comprised of a plurality of images, and the images for the left eye and the images for the right eye are alternately interspersed as shown in FIG. 1.

The lenticular screen 3 directs the images for the left eye provided by the image screen 1 toward a left eye viewing zone marked by a dotted line, and directs the images for the right eye to a right eye viewing zone marked by another dotted line. Accordingly, the two images can be respectively formed at positions separated by a distance D from the lenticular screen 3. Accordingly, when the viewer's left and right eyes are respectively placed in the left eye viewing zone and the right eye viewing zone, each eye sees a slightly different view such that the viewer can see a 3D image.

To separate the images into the views for both eyes, the 3D image display apparatus may employ a parallax barrier, instead of the lenticular screen 3, disposed between the image screen 1 and the viewer.

In the meantime, when the conventional 3D image display apparatus is applied to a portable electronic device, such as a personal digital assistant (PDA) and a mobile phone, if the 3D image display apparatus is moved relative to the viewer, the views for each eye are also moved. Thus, disadvantageously, the images for the left eye may be formed in the right eye viewing zone and the images for the right eye may be formed in the left eye viewing zone. Also, since the 3D image provided through the two-dimensional screen is photographed from a single viewpoint, the 3D image is provided in the same direction even though the viewer's position is relatively changed, thereby decreasing a stereoscopic effect.

SUMMARY OF THE INVENTION

The present invention provides a three-dimensional image display apparatus, which can recognize a position change of a display and provide a multi-viewpoint three-dimensional image depending on the displacement of the display relative to a viewer's position.

According to an aspect of the present invention, there is provided a three-dimensional image display apparatus comprising: a body; a display displaying a three-dimensional image; a gyroscopic sensor mounted on the body and sensing a displacement of the display; and a controller selecting one of at least two-viewpoint three-dimensional image data according to the displacement of the display sensed by the gyroscopic sensor and providing the selected data to the display, wherein multi-viewpoint three-dimensional image data can be provided according to the displacement of the display relative to a viewer's position.

The three-dimensional image display apparatus may further comprise a reset unit that sets an initial value of the gyroscopic sensor so that an arbitrary position selected by the viewer can be set to an initial position.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
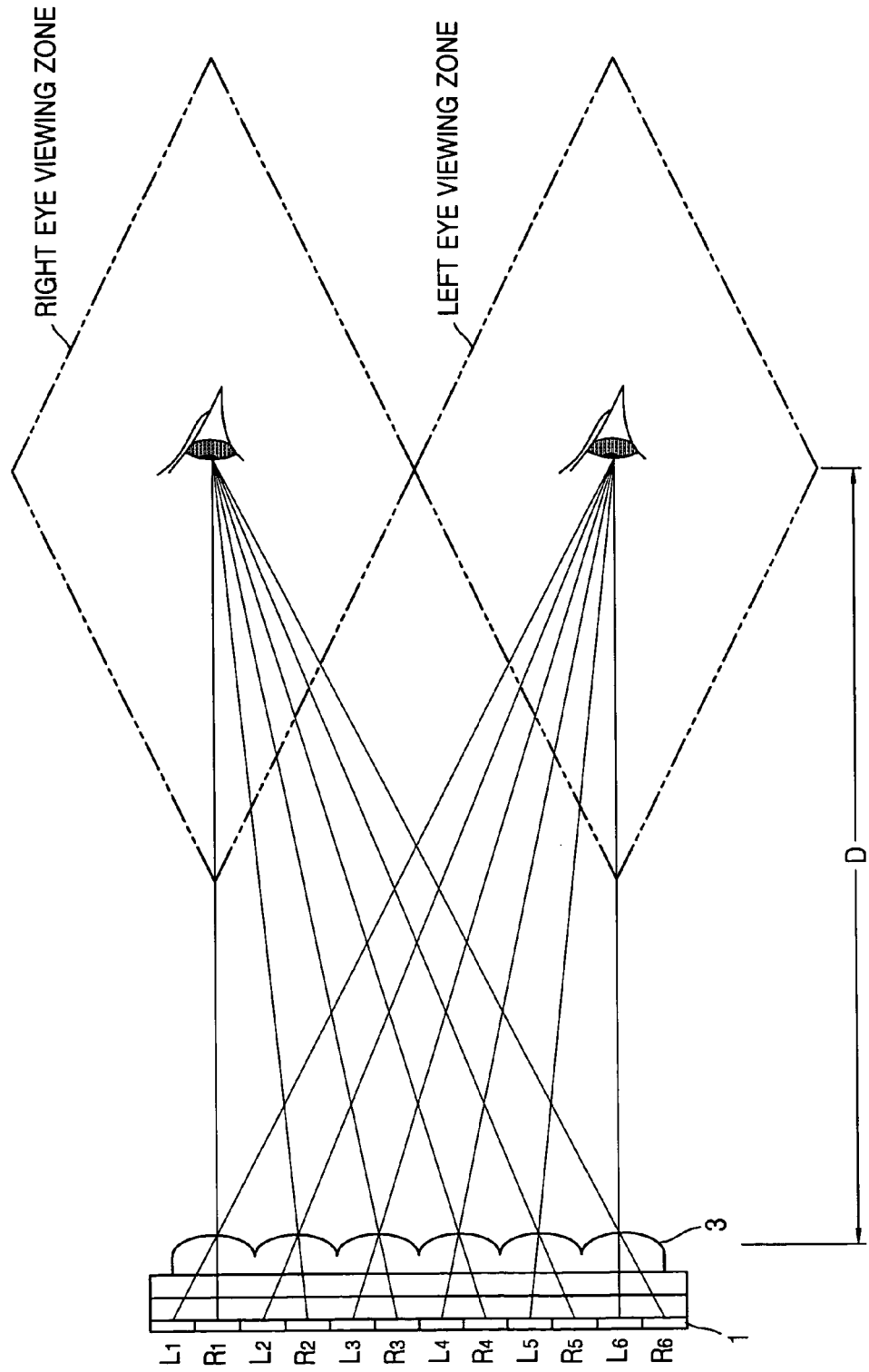
FIG. 1 is a schematic view of a conventional three-dimensional (3D) image display apparatus.
Figure 2:
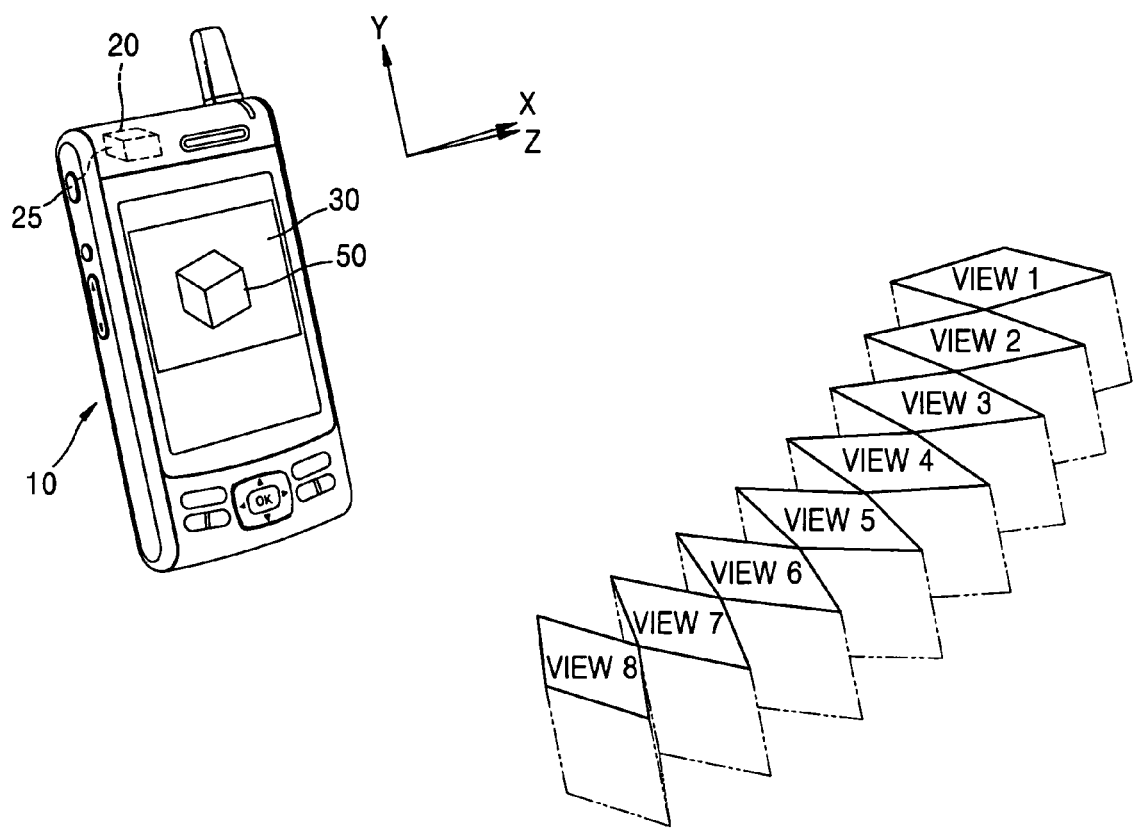
FIG. 2 is a schematic perspective view of a 3D image display apparatus according to an embodiment of the present invention.
Figure 3:
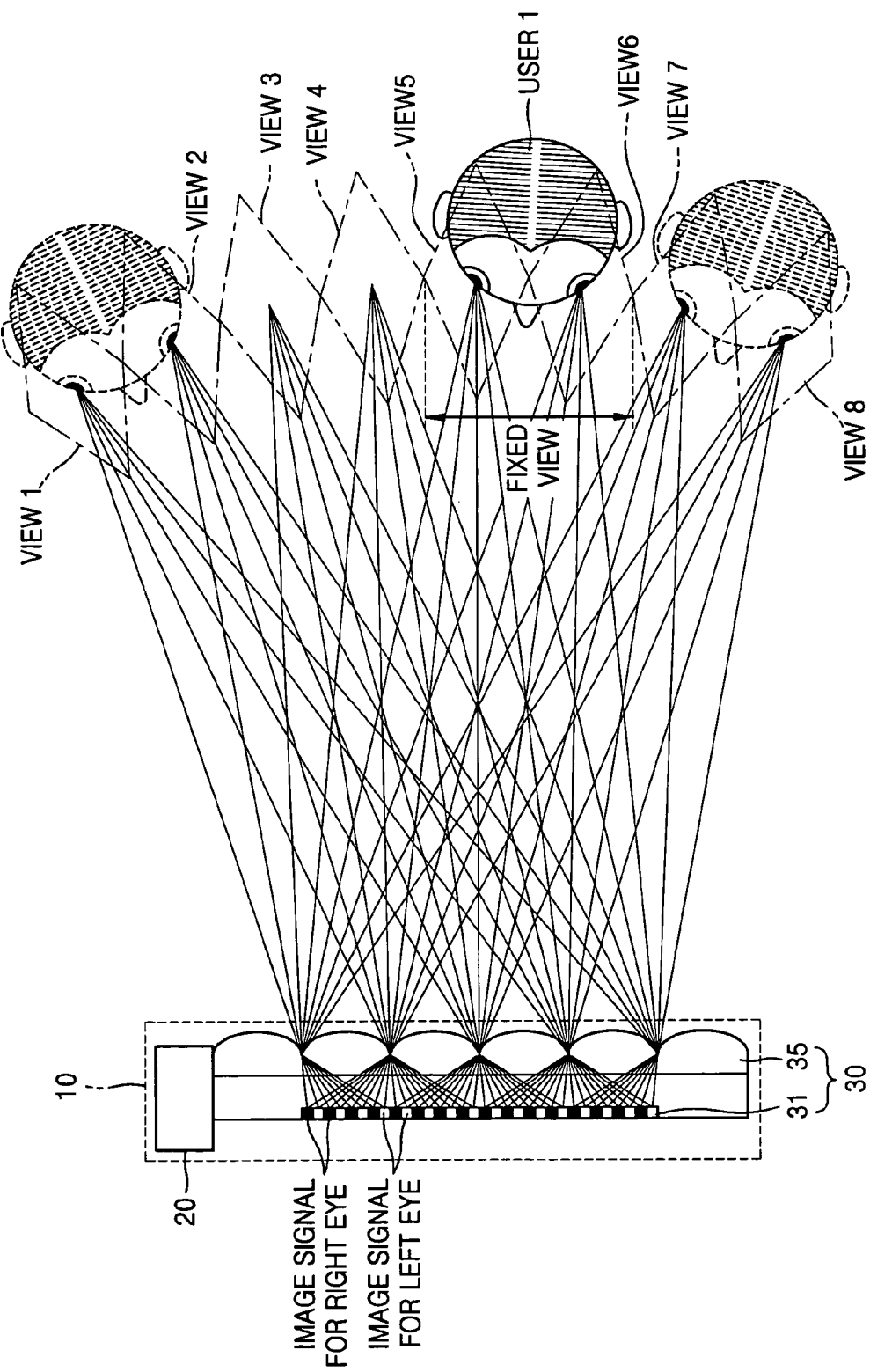
FIG. 3 is a top view of the 3D image display apparatus of FIG. 2.
Figure 4:
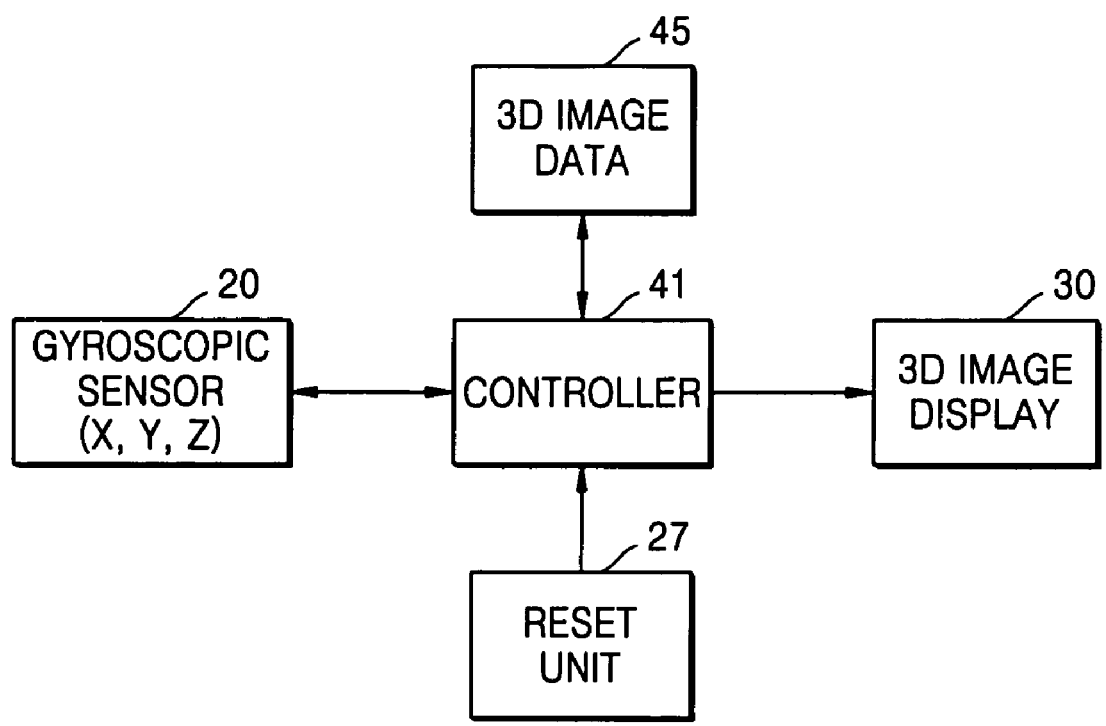
FIG. 4 is a block diagram of the 3D image display apparatus of FIG. 2.

FIG. 2 is a schematic perspective view of a three-dimensional (3D) image display apparatus according to an embodiment of the present invention, the apparatus separating signals for a viewer's left and right views. FIG. 3 is a top view of the 3D image display apparatus of FIG. 2. FIG. 4 is a block diagram of the 3D image display apparatus of FIG. 2.

Referring to FIGS. 2 through 4, the 3D image display apparatus includes a body 10, a 3D image display 30 embedded in the body 10 and providing a 3D image 50, a gyroscopic sensor 20 mounted on the body 10 and sensing a change in the position of the display 30, and a controller 41.

The body 10 may be a personal digital assistant (PDA) providing a 3D image. However, the body 10 is not limited to the PDA, but may be a portable digital device, such as a mobile phone, a desktop computer, a digital television, or a monitor.

The display 30 includes a screen 31 and a view separating unit that separates a 3D image formed on the screen 31. One 3D image data selected by the controller 41 among 3D image data 45 provided to the screen 31 is formed on the screen 31. The view separating unit may be a lenticular lens 35 as shown in FIG. 3 or a parallax barrier (not shown) disposed in front of the screen 31. The view separating unit separates the 3D image data formed on the screen 31 into views for the left eye and the right eye. Since the configuration of the display for providing the 3D image is well known, a detailed explanation thereof will not be given.

The gyroscopic sensor 20 is mounted inside or outside the body 10, and senses a change in the position of the display 30. That is, the gyroscopic sensor 20 is a kind of inertial sensor that senses a change in the position of the display 30 in X, Y, and Z directions. For example, when a user USER 1 holds the body 10 in his hand and rotates the body 10 around the Y-axis, the gyroscopic sensor 20 can sense the displacement of the display 30 along the X-axis. The controller 41 selects one of a plurality of 3D image data (e.g., 7-viewpoint image data) according to the change in the position of the display 30 sensed by the gyroscopic sensor 20, and provides the selected image data to the display 30.

In the present embodiment illustrated in FIGS. 2 through 4, the 3D image display apparatus may further include a reset unit 27 that sets an initial value of the gyroscopic sensor 20. The reset unit 27 is connected to a reset button 25 disposed on an outer surface of the body 10, such that when the user USER 1 presses the reset button 25 at an arbitrary position, the coordinates (X, Y, Z) of the position may be set to (0, 0, 0). By using the reset position as an initial reference position, relative displacements of the body 20 and the display 30 can be sensed. Here, since the configuration of the gyroscopic sensor 20 is well known, a detailed explanation thereof will not be given.

In the meanwhile, the 3D image display apparatus according to the present embodiment illustrated in FIGS. 2 through 4 includes at least two-viewpoint 3D image data 45 for one 3D image that is to be provided. Here, one-viewpoint 3D image data denotes minimum 3D image data necessary for the user USER 1 to see a 3D image through his left and right eyes from one fixed view.

Figure 8:
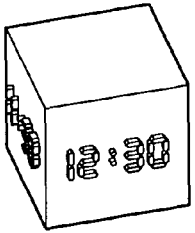
Figure 8:
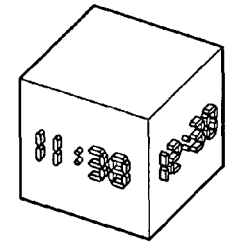
Figure 8:
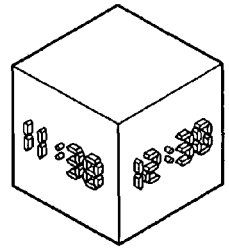
Figure 8:
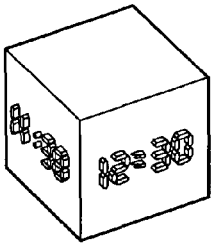
Figure 8:
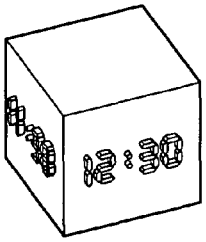
Figure 8:
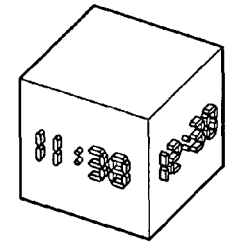
Figure 8:
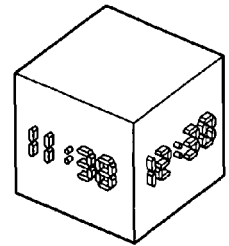

The 7-viewpoint 3D image data 45 will be exemplarily explained herein below. The 7-viewpoint 3D image data 45 may be seven image data for the left eye and seven image data for the right eye obtained by photographing a 3D subject from positions corresponding to views 1 through 8, or image data correspondingly obtained by a computer graphic procedure. Referring to FIG. 3, one-viewpoint 3D image data among the obtained 7-viewpoint 3D image data is divided into views 1 through 8. That is, image signals for the right eye can be seen from the views 1 through 7, and image signals for the left eye can be seen from the views 2 through 8. Accordingly, when the right and left eyes of the user USER 1 are respectively placed in the views 1 and 2, 2 and 3, 3 and 4, 4 and 5, 5 and 6, 6 and 7, or 7 and 8, the user USER 1 can see a 3D image displayed on the display 30 as shown in FIG. 8.

Figure 5:
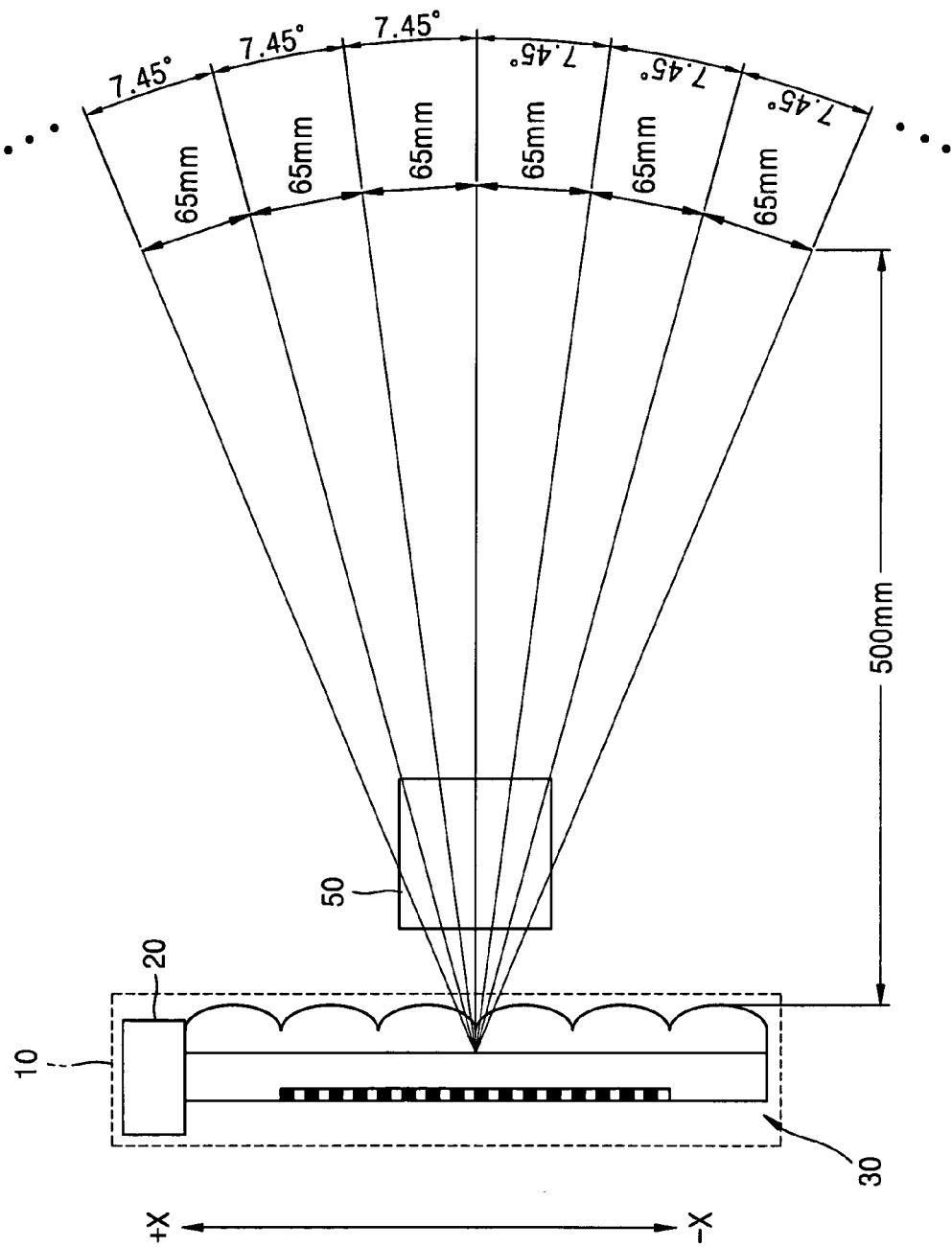
FIG. 5 is a schematic view of the 3D image display apparatus of FIG. 2 for explaining a relationship between an eye view and a viewing angle.

FIG. 5 is a top view of the 3D image display apparatus of FIG. 2, illustrating a relationship between a view and a viewing angle. Referring to FIG. 5, when an optimal distance between the body 10 and the user USER 1 is approximately 500 mm and a distance between the user's right eye and left eye is approximately 65 mm, the viewing angle of each view is approximately 7.45°.

Based on the relationship between the view and the viewing angle and the position of the display 30 sensed by the gyroscopic sensor 20, the controller selects one of the 7-viewpoint 3D image data for a subject 50, thereby producing a 3D image depending on the position of the user USER 1.

The operation of the 3D image display apparatus according to the present embodiment illustrated in FIG. 2 will now be explained with reference to FIGS. 3, and 6 through 8.

Referring to FIG. 3, the image provided by the 3D image display apparatus is separated into the views 1 through 8 to produce a 3D image. When the right eye and left eye of the user USER 1 are respectively placed in the views 5 and 6, the body 10 is spaced by a predetermined distance from the user USER 1 to face the front of the user USER 1. In this state, if the user USER 1 resets the gyroscopic sensor 20 by pressing the reset button 25, the position becomes an initial value of the display 30. One selected from the two or more-viewpoint 3D image data, for example, 3D image data seen from the views 5 and 6 of FIG. 8, can be displayed on the display 30.

In this case, even when the right and left eyes of the user USER 1 are respectively placed in the views 1 and 2 or the views 7 and 8 while the 3D image display apparatus is fixed, the same 3D image as that seen from the views 5 and 6 can be created.

However, when the body 10 is displaced while the position of the user USER 1 is in the fixed views, the gyroscopic sensor 20 can detect the displacement of the body 10. Accordingly, by providing other viewpoint 3D image data, a 3D image obtained by viewing the subject 50 from another position can be produced.

Figure 6:
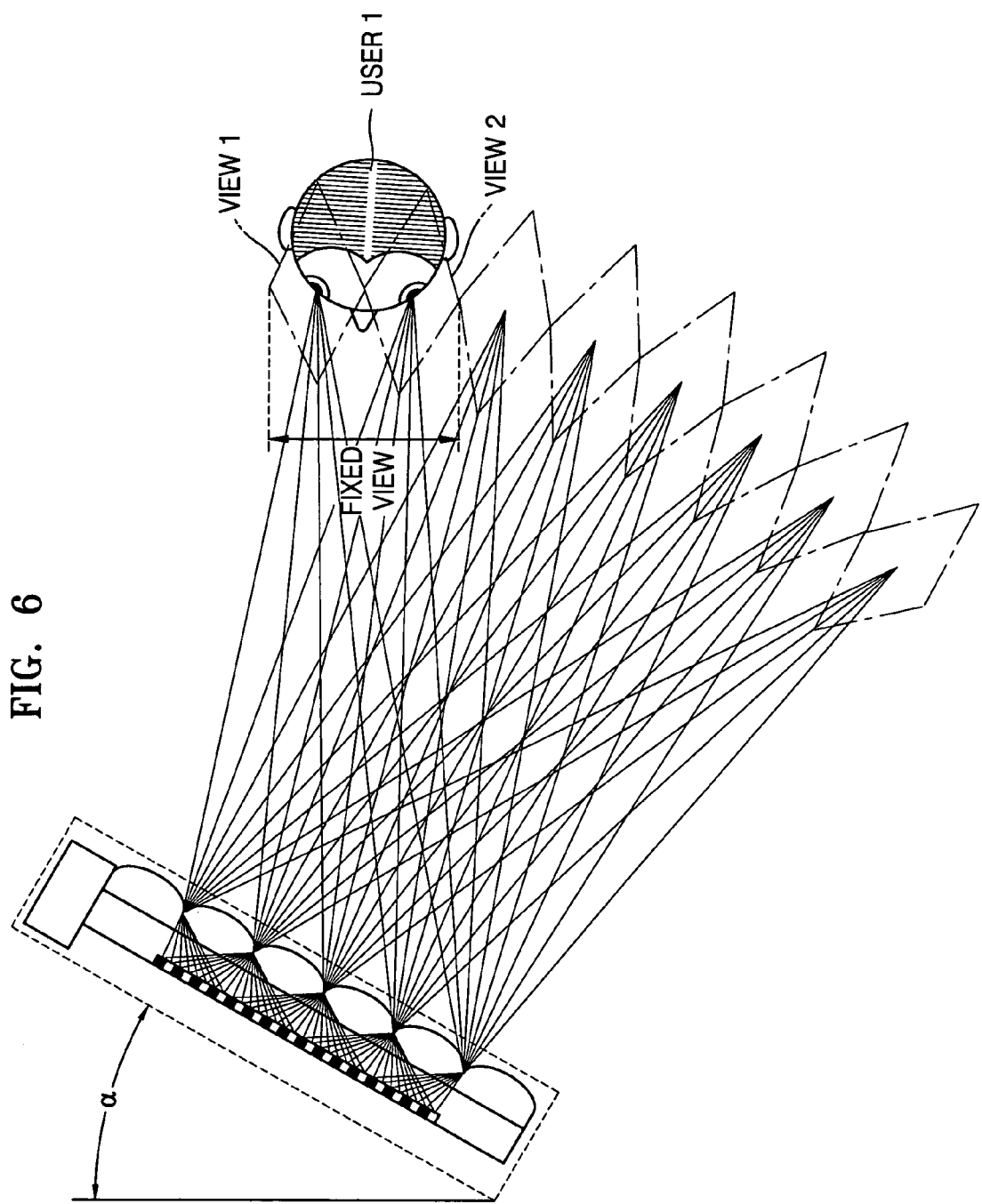
FIGS. 6 through 8 are schematic views for explaining the operation of the 3D image display apparatus of FIG. 2.

FIG. 6 is a top plan view when the user USER 1 is in the fixed views and the body 10 is rotated clockwise by an angle α from the position of FIG. 3. In this case, the right eye and left eye of the user USER 1 are respectively placed in the views 1 and 2. Here, the gyroscopic sensor 20 senses the displacement of the body 10 and displays a corresponding 3D image, for example, the 3D image seen from the views 1 and 2 of FIG. 8, on the display 30. Accordingly, the 3D image showing the right side of the subject 50 can be seen more clearly as compared with that of FIG. 3, thereby making the user USER 1 feel as though he were directly seeing the subject 50.

Further, when the fixed views is placed in the views 3 and 4, the same 3D image as a second 3D image of FIG. 8 can be achieved.

Figure 7:
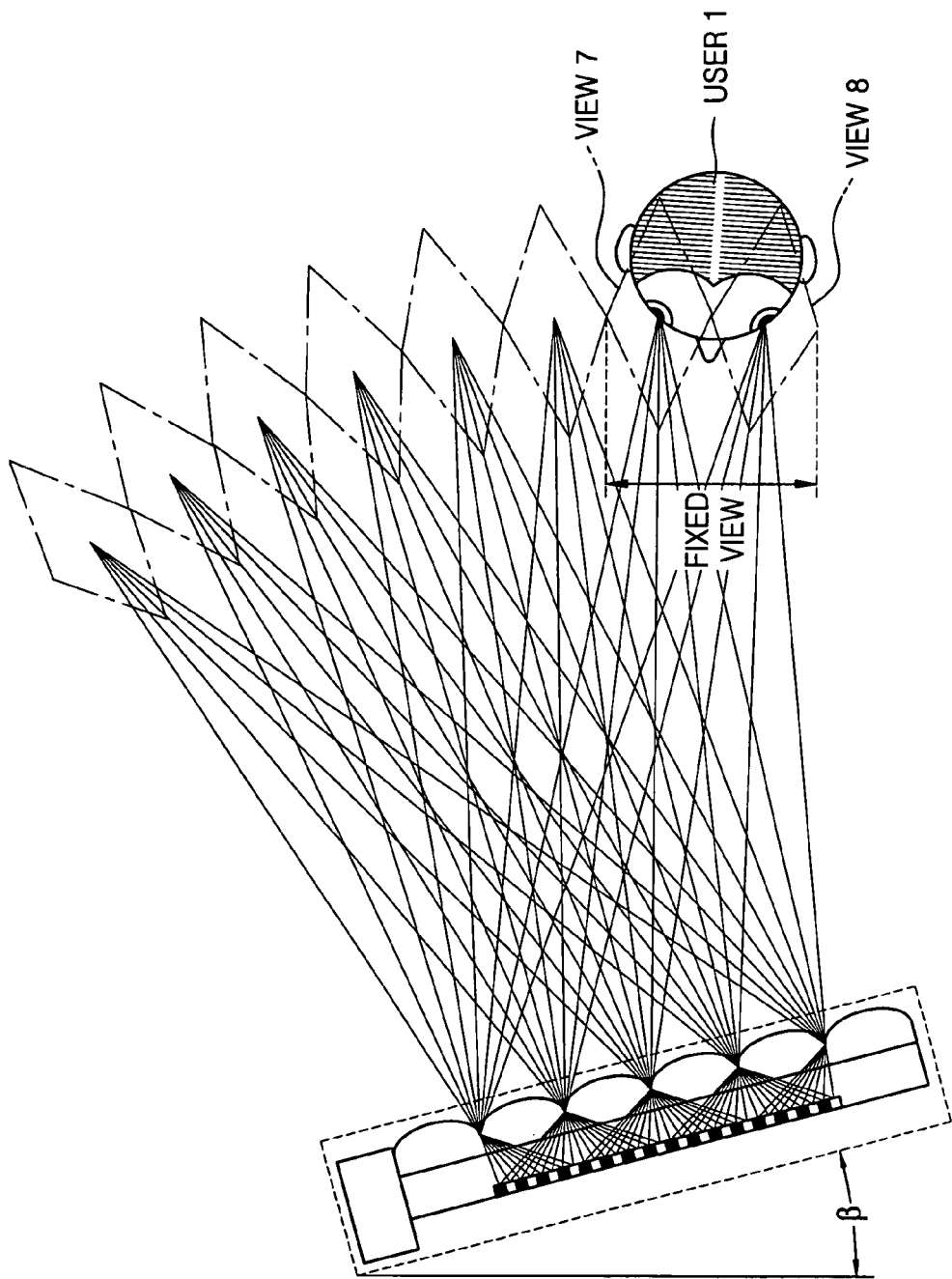

FIG. 7 is a top view when the user USER 1 is in fixed views and the body 10 is rotated counterclockwise by an angle β from the position of FIG. 3. In this case, the right eye and left eye of the user USER 1 are placed in the views 7 and 8. Here, the gyroscopic sensor 20 senses the displacement of the body 10 and displays a corresponding 3D image, for example, the 3D image viewed from the views 7 and 8 of FIG. 8, on the display 30. Accordingly, the 3D image showing the left side of the subject 50 can be seen more widely as compared with that of FIG. 3.

As described above, since the 3D image display apparatus according to the present invention can sense the displacement of the display using the gyroscopic sensor mounted on the body and provide a 3D image selected from a plurality of viewpoint image data according to the displacement, the 3D image can provide a stereoscopic effect such that the user feels as though he is directly seeing the 3D subject.

The 3D image display apparatus can be widely applied to apparatuses such as, but not limited to, a liquid crystal display (LCD), a plasma display panel (PDP), a flat panel display, a 3D game device, a television for broadcasting, a 3D display for military training, a 3D display for simulation, and a 3D display for medical application as well as a portable display device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A three-dimensional image display apparatus comprising:
   a body;
   a display displaying a three-dimensional image;
   a gyroscopic sensor mounted on the body and sensing a displacement of the display; and
   a controller selecting one of at least two-viewpoint three-dimensional image data according to the displacement of the display sensed by the gyroscopic sensor and providing the selected data to the display,
   wherein multi-viewpoint three-dimensional image data can be provided according to the displacement of the display relative to a viewer's position.

2. The three-dimensional image display apparatus of claim 1, wherein the gyroscopic sensor is mounted inside or outside the body.

3. The three-dimensional image display apparatus of claim 2, further comprising a reset unit that sets an initial value of the gyroscopic sensor so that an arbitrary position selected by the viewer can be set to an initial position.

4. The three-dimensional image display apparatus of claim 1, further comprising a reset unit that sets an initial value of the gyroscopic sensor so that an arbitrary position selected by the viewer can be set to an initial position.

5. The three-dimensional image display apparatus of claim 1, wherein the display comprises:
   a screen embedded in the body and on which the three-dimensional image data selected by the controller is formed; and
   a view separating unit separating the three-dimensional image data formed on the screen into images for left and right eyes.

6. The three-dimensional image display apparatus of claim 5, wherein the view separating unit is a lenticular lens disposed in front of the screen.

7. The three-dimensional image display apparatus of claim 5, wherein the view separating unit is a parallax barrier disposed in front of the screen.

* * * * *